(12) United States Patent
Bergmann (10) Patent No.: US 6,240,222 B1
(45) Date of Patent: May 29, 2001

(54) WAVELENGTH SPECIFIC OPERATIONS IN OPTICAL SYSTEMS

(75) Inventor: Ernest Eisenhardt Bergmann, Borough of Fountain Hill, PA (US)

(73) Assignee: Agere Systems Optoelectronics Guardian Corp., Miami, FL (US)

( * ) Notice: Subject to any disclaimer, the term of this patent is extended or adjusted under 35 U.S.C. 154(b) by 0 days.

(21) Appl. No.: 09/150,953

(22) Filed: Sep. 10, 1998

(51) Int. Cl.$^7$ ....................................... G02B 6/28
(52) U.S. Cl. ................... 385/24; 385/16; 385/17; 359/117
(58) Field of Search ................... 385/15–18, 24, 385/47; 359/117, 124, 127, 128

(56) References Cited

U.S. PATENT DOCUMENTS

| | | | |
|---|---|---|---|
| 5,953,470 | * 9/1999 | Toyohara | 385/24 |
| 6,069,719 | * 5/2000 | Mizrahi | 359/124 |
| 6,148,124 | * 11/2000 | Aksyuk et al. | 385/24 |
| 6,185,021 | * 2/2001 | Fatehi et al. | 359/117 |

* cited by examiner

Primary Examiner—John D. Lee
Assistant Examiner—Juliana K. Kang
(74) Attorney, Agent, or Firm—Walter J. Tencza, Jr (57) ABSTRACT

An optical apparatus comprised of a combination multiplexer/demultiplexer, a main coupling device which is preferably a main circulator, and a transition device having various forms. The combination multiplexer/demultiplexer can be comprised of a first bidirectional main input/output port and a set of further bidirectional input/output ports. The main circulator can be comprised of first, second, and third ports wherein the second port of the main circulator is connected to the first bidirectional main input/output port of the combination multiplexer/demultiplexer. The transition device may include a transmitter/receiver device, having first and second further coupling devices which may be first and second further circulators, a first and receivers, and a first and second transmitters. The transition device may also include a reflective variable attenuation device, for reflecting and variably attenuating an output, which may be comprised of further circulator and an attenuator. The function of adding an optical signal or dropping an optical signal can be provided for. The transition device may include a device for allowing either reflection or dropping an optical signal and adding another optical signal.

43 Claims, 9 Drawing Sheets

WAVELENGTH SPECIFIC OPERATIONS IN OPTICAL SYSTEMS

FIELD OF THE INVENTION

This invention relates to improved methods and apparatus for performing wavelength specific optical operations.

BACKGROUND OF THE INVENTION

Figure 8A:
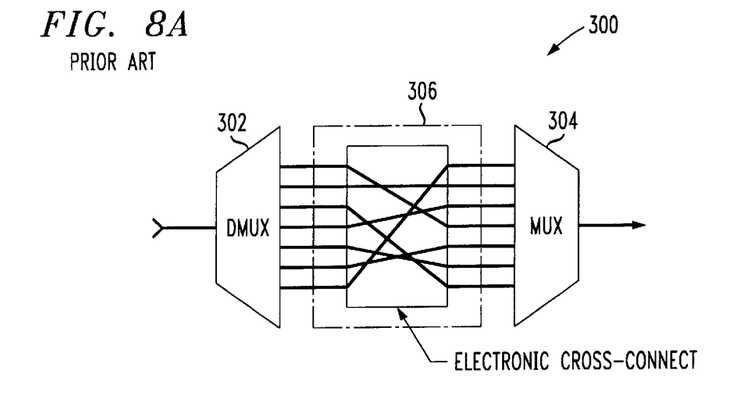
FIGS. 8A–C show various prior art optical devices.
Figure 8B:
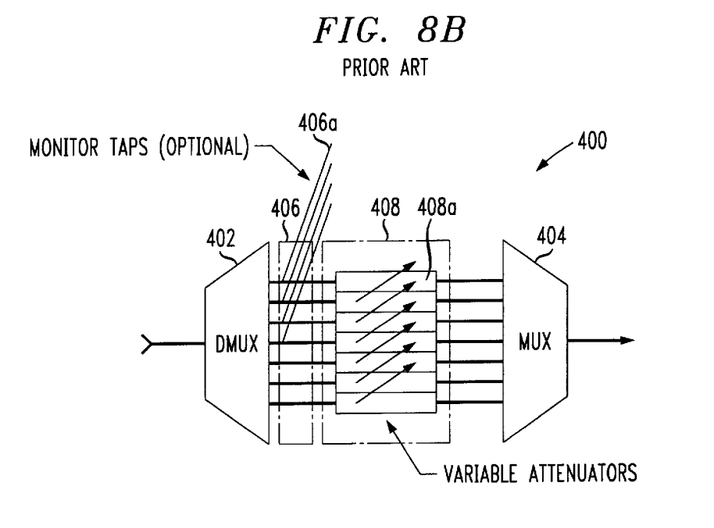
Figure 8C:
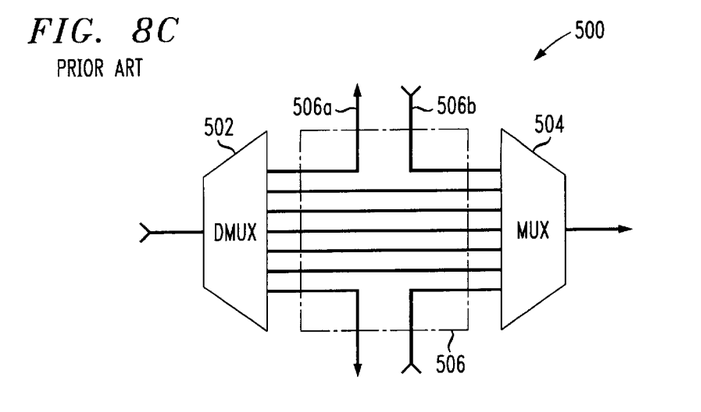

Various methods and apparatus are known in the art for performing wavelength specific optical operations. For example, FIG. 8A shows a prior art optical apparatus 300 for providing cross connections to rearrange optical signals. The optical apparatus 300 includes a demultiplexer 302, a rearranging means 306, and a multiplexer 304. FIG. 8B shows a prior art optical apparatus 400 for providing wavelength dependent variable attenuation. The optical apparatus 400 includes demultiplexer 402, an array of monitors 406, including for example monitor 406a, an array of variable attenuators 408, including for example variable attenuator 408a, and a multiplexer 404. FIG. 8C shows an optical apparatus 500 for adding and dropping of optical signals. Optical apparatus 500 includes a demultiplexer 502, add/drop circuitry 506, including drop line 506a and add line 506b, and multiplexer 504. Optical apparatus 300, 400, and 500 all employ a demultiplexer, a separate multiplexer and various circuitry between the demultiplexer and multiplexer. There is a need for more efficient methods and apparatus for performing these functions and other functions.

SUMMARY OF THE INVENTION

The present invention in one embodiment provides an optical apparatus. The optical apparatus is comprised of a combination multiplexer/demultiplexer, a coupling device which is preferably a main circulator, and a transition device. The coupling device could also be a coupler. The combination multiplexer/demultiplexer is comprised of a first bidirectional main input/output port and a set of further bidirectional input/output ports. The main circulator is comprised of a first, second, and third port wherein the second port of the main circulator is connected to the first bidirectional main input/output port of the combination multiplexer/demultiplexer. The transition device takes a first output from a first further bidirectional input/output port of the combination multiplexer/demultiplexer and supplies the first output to a second further birectional input/output port of the combination multiplexer/demultiplexer. The transition device is preferably connected to both the first and second further bidirectional input/output ports of the combination multiplexer/demultiplexer.

BRIEF DESCRIPTION OF THE DRAWINGS

FIG. 7B shows a second state of the alternate device of FIG. 7A in which optical signals are merely passed back through;

DETAILED DESCRIPTION OF THE INVENTION

The present invention in one embodiment provides an optical apparatus comprised of a combination multiplexer/demultiplexer, a main circulator, and a transition device whose various forms will be described. The combination multiplexer/demultipexer is preferably an optical multiplexer/demultiplexer. The optical apparatus can be provided to perform typical wavelength channel specific activities such as equalization, optical cross connection, monitoring each channel individually, and adding and dropping of optical signals. The combination multiplexer/demultiplexer, main circulator, and transition device to be described replaces prior art devices which include at least one multiplexer and a separate demultiplexer.

The combination multiplexer/demultiplexer can be comprised of a first bidirectional main input/output port and a set of further bidirectional input/output ports. The main circulator can be comprised of first, second, and third ports wherein the second port of the main circulator is connected to the first bidirectional main input/output port of the combination multiplexer/demultiplexer. Generally, an optical circulator having first, second, and third ports has the following characteristics. Light entering the first port will exit the second port. Light entering the second port will exit the third port. Light entering the third port is probably lost and probably emerges nowhere.

The above embodiment of the present invention may also be comprised of the transition device which preferably takes a first output from a first further bidirectional input/output port of the set of further bidirectional input/output ports of the combination multiplexer/demultiplexer and supplies the first output to a second further birectional input/output port of the combination multiplexer/demultiplexer. Said transition device is preferrably connected to both the first and second further bidirectional input/output ports of the combination multiplexer/demultiplexer. The first and second further bidirectional input/output ports may be in fact be one and the same or they may be separate and distinct ports.

Figure 1:
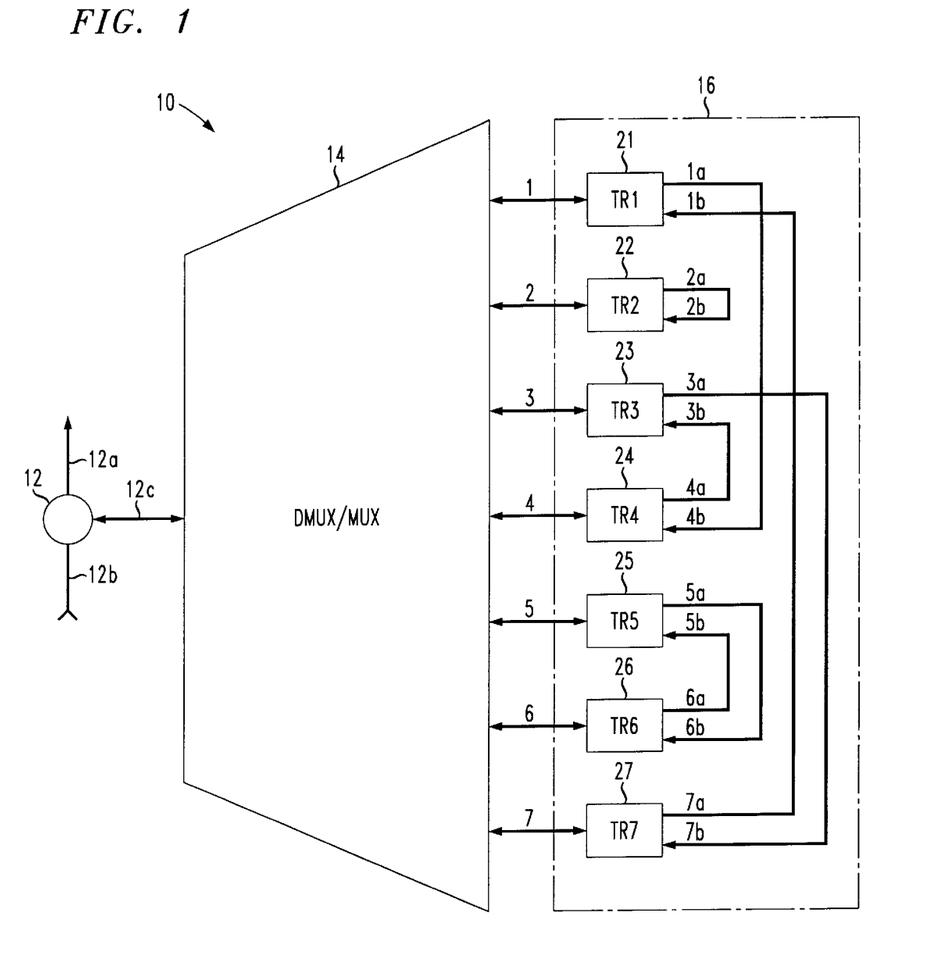
FIG. 1 shows an optical apparatus in accordance with a first embodiment of the present invention.

The transition device may be comprised of a transmitter and receiver device, such as shown in FIG. 1. The transmitter and receiver device may actually be comprised of pieces of two or more transceivers, each of which includes a transmitter and a receiver. The transmitter and receiver device can be used to perform optical cross connection by means of electrical interconnection. The transmitter and receiver device may be comprised of a first and second further circulator, a first receiver, and a first transmitter. The first receiver and first transmitter preferably both have input and output ports, and the first and second further circulators preferably both have first, second and third ports. The transmitter and receiver device may be further comprised of a second receiver and second transmitter both also having input ports and output ports. The first receiver and second transmitter may be part of one transceiver unit and the second receiver and first transmitter may be part of another transceiver unit. A plurality of further circulators, receivers, and transmitters can be provided.

The receivers used with embodiments of the present invention preferably have an optical input port and an electrical output port. The transmitters used with embodiments of the present invention preferably have an optical output port and an electrical input port.

Figure 2:
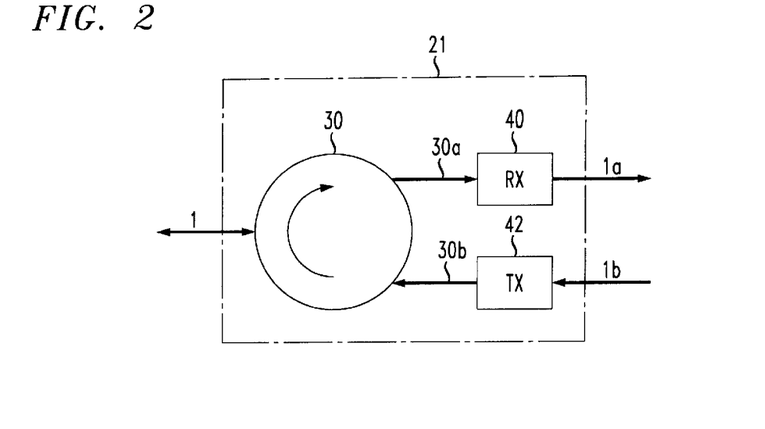
FIG. 2 shows a transceiver unit to be used with the optical apparatus of FIG. 1.

A first transceiver can be provided in the following manner as shown in FIG. 2. The second, third, and first port of the first further circulator is preferably connected to the first further bidirectional input/output port of the combination multiplexer/demultiplexer, the input port of the first receiver, and the output port of the second transmitter, respectively. The first further circulator, first receiver, and second transmitter and the above ports and connections form a first transceiver.

A second transceiver, which can be of the same type as in FIG. 2, can be provided in the following manner. The second, third, and first port of the second further circulator is preferably connected to the second further bidirectional input/output port of the combination multiplexer/demultiplexer, the input port of the second receiver, and the output port of the first transmitter, respectively.

The first further circulator, first receiver, and second transmitter can be thought of as a first transceiver unit. The second further circulator, second receiver, and first transmitter can be thought of as a second transceiver unit. A plurality of further transceivers units can be provided.

The electrical output port of the first receiver can be coupled to the electrical input port of the first transmitter. This provides the electronic cross connect function. The terms "first receiver" and "first transmitter" are only used for identification purposes. One can arbitrarily connect any output port of any receiver to any input port of any transmitter to provide the cross connect function. Preferably a plurality of electrical output ports from a corresponding plurality of receivers are cross connected with a plurality of electrical input ports of a plurality of corresponding transmitters. For example, electrical output ports of first, second, and third receivers may be connected to electrical input ports of third, second and first transmitters, in that order or in any other arbitrary order.

The first and second further circulators, previously referred to, may be one and the same or may be distinct devices.

Figure 3:
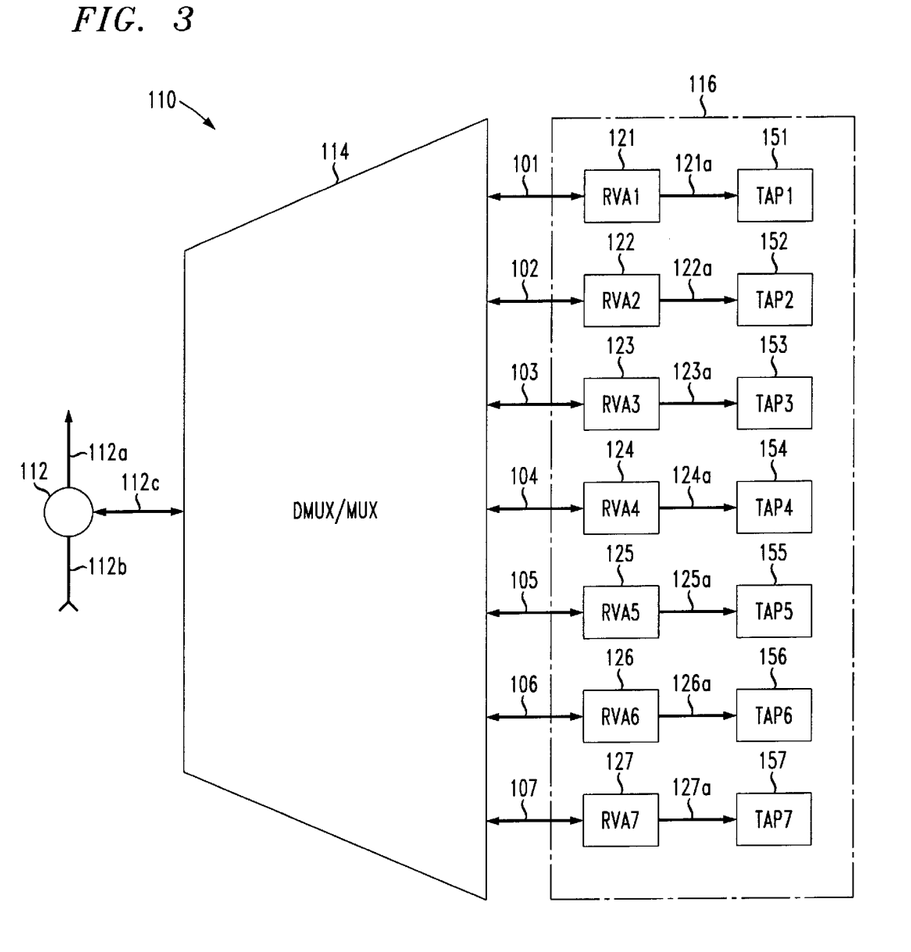
FIG. 3 shows an optical apparatus in accordance with a second embodiment of the present invention.
Figure 4:
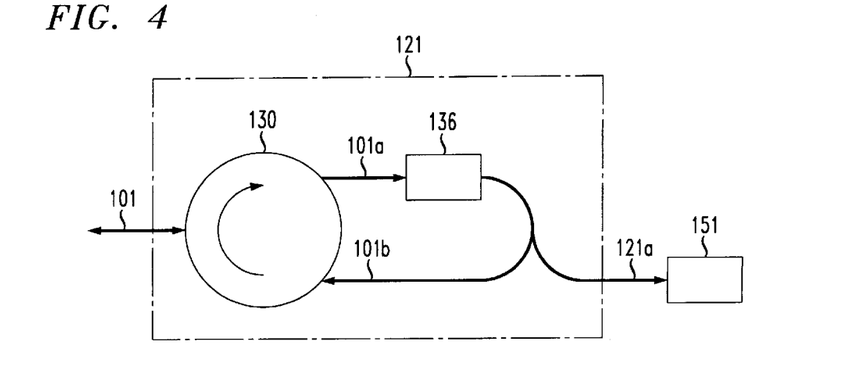
FIG. 4 shows a reflective variable attenuation device with optional tap and photodetector for use with the optical apparatus of FIG. 3 in accordance with an embodiment of the present invention.

In another embodiment the transition device is comprised of a reflective variable attenuation device, the first output of the first further bidirectional input/output port, as shown in FIGS. 3 and 4. The reflective variable attenuation device the first output may be comprised of a further circulator and an attenuator, as shown in FIG. 4. The reflective variable attenuation device may perform the function of matching time-averaged individual power levels for each wavelength channel to some desired profile. Preferably a plurality of outputs corresponding to a plurality of different wavelength channels also have their time averaged power levels matched to some desired profile.

As shown in FIGS. 3 and 4, the further circulator in the reflecting and variable attenuation embodiment, can be comprised of second, third, and first ports, the second port of the further circulator connected to the first further bidirectional input/output port of the multiplexer/demultiplexer. The attenuator can include an input port connected to the third port of the further circulator, and the attenuator's output port connected to the first port of the further circulator. In this embodiment the first and second further bidirectional input/output ports can be one and the same.

Figure 5:
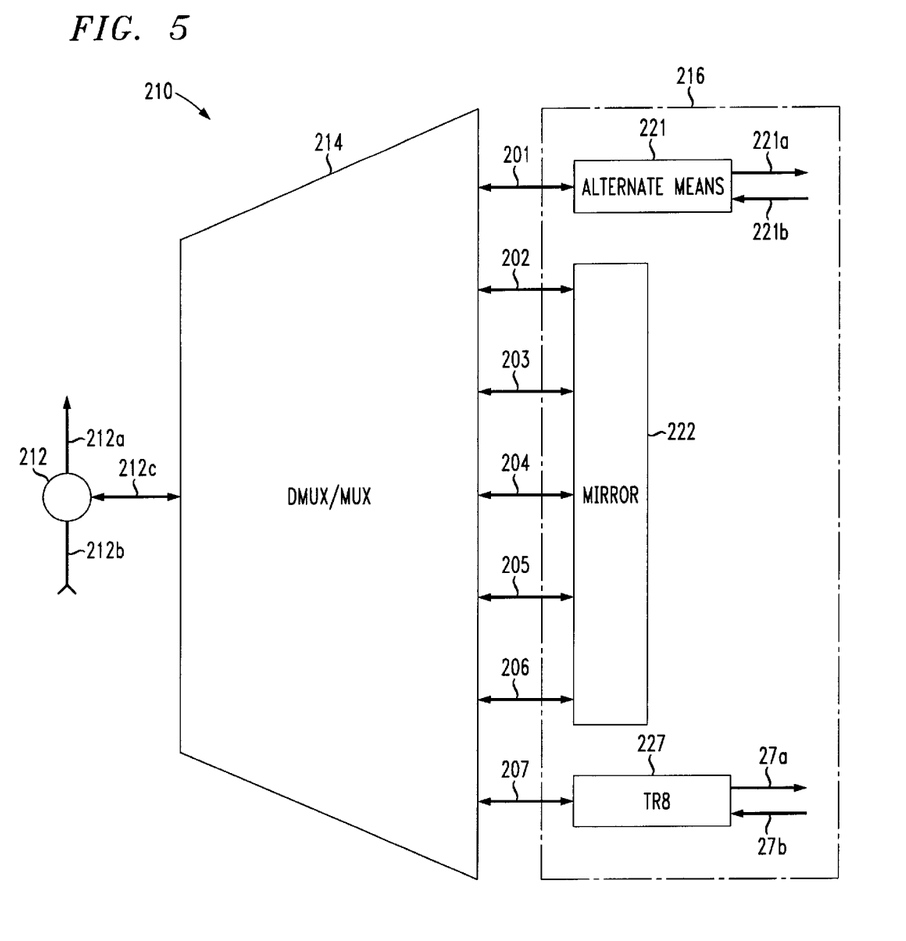
FIG. 5 shows an optical apparatus in accordance with a third embodiment of the present invention.
Figure 6:
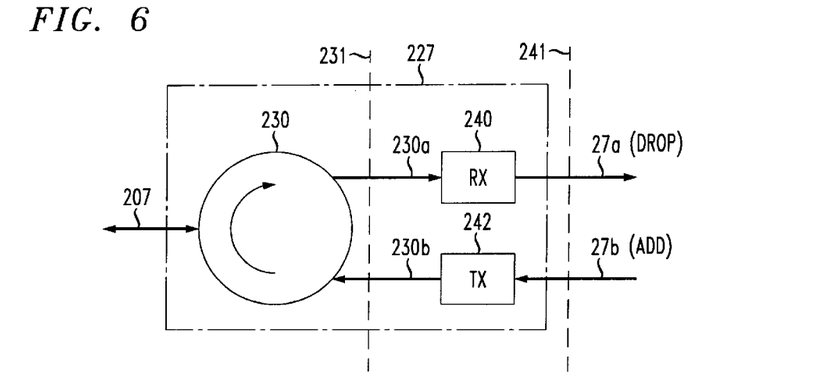
FIG. 6 shows a transceiver for use with the optical apparatus of FIG. 5.

In another embodiment the transition device can provide the function of adding an optical signal or dropping an optical signal, as shown by FIGS. 5 and 6. One of the set of further bidirectional input/output ports of the combination multiplexer/demultiplexer can be connected to a transmitter/receiver device to provide the adding or dropping function. The transmitter/receiver device can include a further circulator, a receiver and a transmitter. The further circulator would include second, third, and first ports, the second port being connected to a further bidirectional input/output port of the combination multiplexer/demultiplexer. The receiver would have an input port optically connected to the third port of the circulator. The transmitter would have an output port optically connected to the first port of the circulator. The transmitter would be used to add a signal and the receiver would be used to drop a signal.

The transition device may also include a device for allowing either reflection or dropping an optical signal and adding another optical signal, as shown by FIGS. 5, 7A–7C. This device may be connected to a one of the set of further bidirectional input/output ports of the multiplexer/demultiplexer. The device for allowing either reflection or dropping an optical signal and adding another optical signal can be comprised of a further circulator, a 2-by-2 switch, a receiver, and a transmitter. The circulator may have a second port which connects to the further bidirectional input/output port. The 2-by-2 switch may have first and second input ports, and first and second output ports.

Figure 7A:
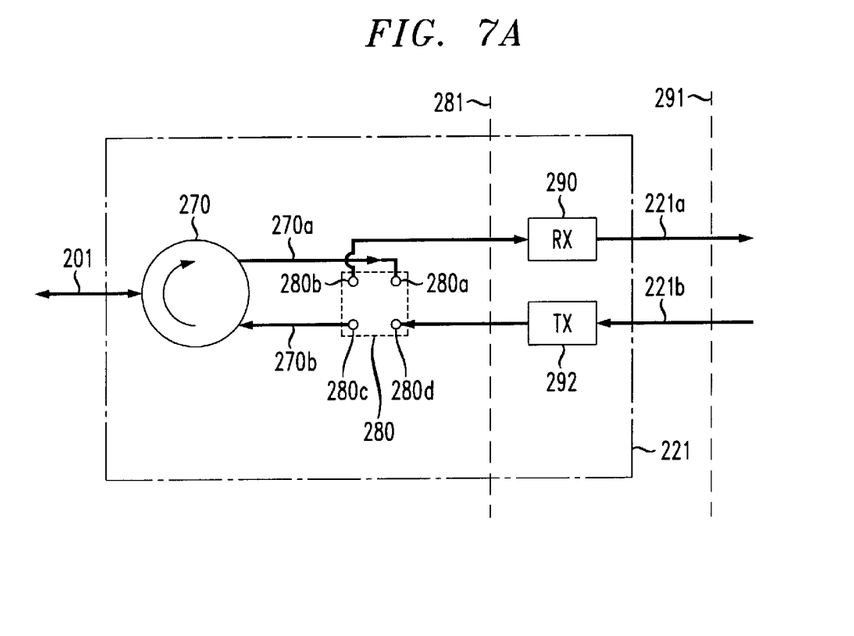
FIG. 7A shows a diagram of an alternate device for use with the optical apparatus of FIG. 5.

The 2-by-2 switch can be placed in at least a first state and a second state. In the first state (also known as a "bar" state), an optical signal is allowed to pass through, as shown in FIG. 7C. The first and second input ports of the 2-by-2 switch are connected to the first and second output ports, respectively of the 2-by-2 switch, so that an optical signal can pass from the third port of the further circulator to the optical input port of the receiver and an optical signal can pass from the optical output port of the transmitter to the first port of the further circulator.

Figure 7B:
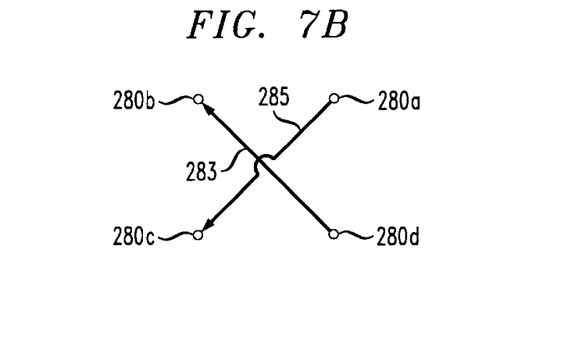
Figure 7C:
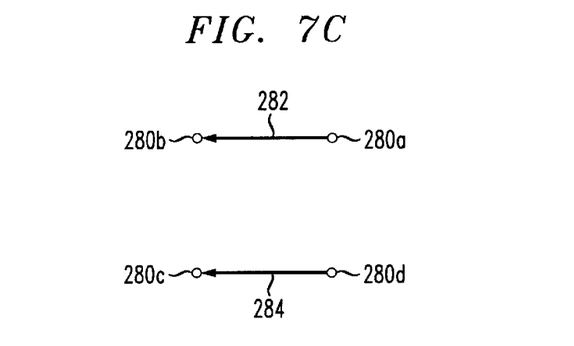
FIG. 7C shows a first state of the alternate device of FIG. 7A in which optical signals are added and/or dropped.

In the second state, (also known as a "cross" state), an optical signal is reflected back, as shown in FIG. 7B. Inside of the 2-by-2 switch, The first input port of the 2-by-2 switch is connected to the second output port of the 2-by-2 switch. An optical signal coming from the third port of the circulator is thus sent via the first input port and second output port of the 2-by-2 switch back to the first port of the circulator. In this manner, the optical signal is "reflected" back.

FIG. 1 shows an optical apparatus 10 in accordance with a first embodiment of the present invention. Optical apparatus 10 includes main circulator 12, combination multiplexer/demultiplexer 14, and transition device 16.

Main circulator 12 is comprised of input port 12b, bidirectional input/output port 12c, and output port 12a. The bidirectional input/output port 12c is also the main bidirectional input/output port 12c of multiplexer/demultiplexer 14. Multiplexer/demultiplexer 14 also is comprised of further bidirectional input/output ports 1, 2, 3, 4, 5, 6, and 7. Preferably a signal of multiple wavelengths on bidirectional input/output port 12c is demultiplexed into a plurality of signals, each signal having a different wavelength, one of the plurality of signals on each of the further bidirectional input/output ports 1–7.

Bidirectional input/output ports 1, 2, 3, 4, 5, 6, and 7 are also the bidirectional input/output ports of and are optically connected to transceivers 21, 22, 23, 24, 25, 26, and 27 respectively, of the transition device 16. The transceivers 21, 22, 23, 24, 25, 26, and 27 also each have an electrical input and an electrical output port. The transceivers 21, 22, 23, 24, 25, 26, and 27, have electrical output and electrical input ports 1a and 1b, 2a and 2b, 3a and 3b, 4a and 4b, 5a and 5b, 6a and 6b, 7a and 7b, respectively. The electrical input and electrical output ports of the transceivers are cross connected to rearrange the association of signals with wavelengths. Output port 1a of transceiver 21 is connected to input port 4b of transceiver 24. Output port 2a of transceiver 22 is connected to input port 2b of transceiver 22. Output port 3a of transceiver 23 is connected to input port 7b of transceiver 27. Output port 4a of transceiver 24 is connected to input port 3b of transceiver 23. Output port 5a of transceiver 25 is connected to input port 6b of transceiver 26. Output port 6a of transceiver 26 is connected to input port 5b of transceiver 25. Output port 7a of transceiver 27 is connected to input port 1b of transceiver 21. It is understood that the above described electrical cross-connect is illustrative only. It may be re-arranged quickly and often under computer control, as would be expected of typical communications needs.

FIG. 2 shows a possible embodiment of a transceiver 21 to be used with the optical apparatus 10 of FIG. 1. The transceiver 21 includes a circulator 30, a receiver 40, and a transmitter 42. The circulator 30 has a bidirectional input port 1, an output port 30a, and an input port 30b. The output port 30a of the circulator 30 is the optical input port of the receiver 40. The receiver 40 has as an electrical output port, the output port 1a. The transmitter 42 has as an electrical input port, the input port 1b and has an optical output port, the port 30b.

In operation, referring to FIGS. 1 and 2, the optical apparatus 10 functions as follows. An original optical signal having multiple wavelengths is supplied to the main circulator 12 at its input port 12b. The original optical signal is output to the combination multiplexer/demultiplexer 14 via the main bidirectional input/output port 12c. The combination multiplexer/demultiplexer 14 then outputs a component optical signal on each of the further bidirectional input/output ports 1–7, each component optical signal having a different wavelength, the component optical signals derived from the original optical signal. This is the demultiplexing step.

The first component optical signal is output on the further bidirectional input/output port 1 and is thus sent to transceiver 21. Referring to FIG. 2, the first component optical signal is input to circulator 30 and is then output at output port 30a. The first component optical signal then is supplied to receiver 40 which then outputs its electrical output to electrical output port 1a. As shown in FIG. 1, electrical output port 1a is connected to electrical input port 4b of transceiver 24. Thus the first component optical signal is then electrically coupled from output port 1a to input port 4b. Transceiver 24 can have the same structure and components as transceiver 21 which is shown in FIG. 2.

A transmitter in transceiver 24, analogous to transmitter 42 in transceiver 21, will have the first component optical signal (now in electrical form) supplied to its electrical input port, analogous to electrical input port 1b, and will supply the first component optical signal to its optical output port, analogous to output port 30b. The first component optical signal will pass through a circulator analogous to circulator 30 and will appear at further bidirectional input/output port 4. In this manner the first component optical signal has been reordered and reconstructed with a new wavelength from the further bidirectional input/output port 1 to 4. The other component signals starting on the other further bidirectional input/output ports 2 through 7 are also reordered and reconstructed with new wavelengths, except for port 2, as shown by the diagram of FIG. 1. Finally the component signals are recombined, which is the multiplexing step, and output on bidirectional output/input port 12c of demultiplexer/multiplexer 14. The action of the main circulator 12 is then to present the remultiplexed signals to output port 12a.

Although not expressly specified it is understood by those skilled in the art that various ports can be connected by optical fibers or in other ways, such as electrical connection, which is the manner in which ports 1a and ports 4b are preferably connected in FIG.1. Also although ports, such as ports 1–7, and port 12c shown in FIG. 1 have been referred to as shared, a "port" in practice may be replaced by two ports with an optical fiber or other optical waveguide connecting the two ports.

FIG. 3 shows an optical apparatus 110 in accordance with a second embodiment of the present invention. Optical apparatus 110 includes main circulator 112, combination multiplexer/demultiplexer 114, and transition device 116.

Main circulator 112 is comprised of input port 112b, bidirectional input/output port 112c, and output port 112a. The bidirectional input/output port 112c is also the main bidirectional input/output port 112c of multiplexer/demultiplexer 114. Multiplexer/demultiplexer 114 also is comprised of further bidirectional input/output ports 101, 102, 103, 104, 105, 106, and 107.

Bidirectional input/output ports 101, 102, 103, 104, 105, 106, and 107 are also the bidirectional input/output ports of and are connected to reflective variable attenuators 121, 122, 123, 124, 125, 126, and 127 respectively, of the transition device 116. The reflective variable attenuators 121, 122, 123, 124, 125, 126, and 127 also each have optionally an optical output port, 12 1a, 122a, 123a, 124a, 125a, 126a, and 127a, which are input ports of and are connected to optional photodetectors 151, 152, 153, 154, 155, 156, and 157, respectively.

FIG. 4 shows a possible embodiment of reflective variable attenuator 121 and an optional photodetector 151 for use with the optical apparatus 110 of FIG. 3 in accordance with an embodiment of the present invention. The reflective variable attenuator 121 includes a circulator 130 and a variable optical attenuator 136. The circulator 130 has a bidirectional input/output port 101, output port 101a and input port 101b. Output port 101a is the input port of and is connected to variable optical attenuator 136. The optical output port of attenuator 136 is the input port 101b of the circulator 130. An output port 12 1a is optionally tapped off of the input port 101b and is an input port of photodetector 151.

In operation, referring to FIGS. 3 and 4, the optical apparatus 110 functions as follows. An original optical signal comprised of several wavelength channels comes in on input port 112b of the main circulator 112. The original optical signal is output on main bidirectional input/output port 112c to the multiplexer/demultiplexer 114. The original optical signal is separated into component optical signals each having a different wavelength. This is the demultiplexing step. A first component optical signal appears on the further bidirectional input/output port 101 and is sent to the reflective variable attenuator 121. Other component optical signals will appear on further bidirectional input/output ports 102–107.

FIG. 4 refers to a possible embodiment of a reflective variable attenuator. The first component optical signal is supplied to circulator 130 and is output to output port 101a. The first component optical signal is then supplied to attenuator 136. The variable optical attenuator 136 attenuates the first component optical signal. The amount of attenuation preferably can be varied. The attenuated first component optical signal is sent back to the circulator 130 through input port 101b. The signal is then supplied back to multiplexer/demultiplexer 114 via further bidirectional input/output port 101. Optionally, the signal is also optionally tapped off by optical tap output port 12 1a into optional photodetector 151 to monitor it.

Other component optical signals on bidirectional input/output ports 102, 103, 104, 105, 106, and 107 are operated on in the similar manner to the first component optical signal on bidirectional input/output port 101, although the amount of attenuation may be different for each component optical signal. Upon returning from reflection and attenuation the component optical signals are combined by multiplexer/demultiplexer 114 and sent to main bidirectional input/output port 112c to main circulator 112. This is the multiplexing step. The main circulator 112 sends this combined output signal to output port 112a. In this manner, one can control the relative strengths of the signals in the different wavelength channels.

FIG. 5 shows an optical apparatus 210 in accordance with a third embodiment of the present invention. Optical apparatus 210 includes main optical circulator 212, combination optical multiplexer/demultiplexer 214, and transition device 216.

Main circulator 212 is comprised of input port 212b, bidirectional input/output port 212c, and output port 212a. The bidirectional input/output port 212c is also the main bidirectional input/output port 212c of multiplexer/demultiplexer 214. Multiplexer/demultiplexer 214 also is comprised of further bidirectional input/output ports 201, 202, 203, 204, 205, 206, and 207.

Bidirectional input/output ports 202, 203, 204, 205, and 206 are also the bidirectional input/output ports of and are connected to the mirror 222. In this application a mirror can be any device which returns light back to the same port. The mirror 222 need not be shared. Individual mirrors are possible. Bidirectional input/output port 201 and 207 are connected to alternate device 221 and tranceiver 227, respectively.

One possible embodiment of the transceiver 227 is shown in more detail in FIG. 6. Transceiver 227 includes an optical circulator 230, a receiver 240, and a transmitter 242. The transceiver 227 can also be thought of as having optical interface 231 and an electronic interface 241. Signals can be added or dropped at the optical level, i.e. without using the receiver 240 or transmitter 242 or at the electronic level, with use of the receiver 240 and the transmitter 242. The circulator 230 includes an output port 230a and an input port 230b as well as bidirectional input/output port 207. The receiver 240 has as its optical input port the output port 230a and has electrical output port 27a and the transmitter has an electrical input port 27b and as its optical output port the input port 230b of circulator 230. A signal leaving receiver 240 at output port 27a is "dropped", i.e. taken out of the overall multiple wavelength signals, and an optical signal entering transmitter 242 at input port 27b is "added", i.e. added to the multiple wavelength overall signals.

Referring to FIG. 5 the part of the operation of the optical apparatus referring to the mirror 222 will be described. An original optical signal enters at input port 212b of circulator 212 and then is sent to bidirectional input/output port 212c of multiplexer/demultiplexer 214. The original optical signal is multiplexed into multiple optical signals each having a different wavelength. A first component optical signal appears at further bidirectional input/output port 202 and is sent to mirror 222. The first component optical signal is reflected by mirror 222 and is sent back through multiplexer/demultiplexer 214 via further bidirectional input/output port 202 to be recombined with the other component optical signals. The same basic operation occurs for bidirectional input/output ports 203–206, for other component optical signals of different wavelengths. Mirror 222 can be segmented, i.e. there may be a different mirror for each port 203–206.

Referring to FIGS. 5 and 6, a component optical signal on bidirectional input/output port 207 is input to transceiver 227. The signal is sent to optical circulator 230 and appears at output port 230a. The optical signal then is input to receiver 240, is converted to an electrical signal, and the converted electrical signal then appears at output 27a. This optical component signal leaves the optical apparatus 210 as an electrical output and is thus dropped from the overall signal. The receiver 240 may be remote (i.e. not part of the optical apparatus 210) and in that case the signal would leave optical apparatus 210 as an optical signal. If the receiver 240 is not remote, the optical signal component is absorbed (consumed) within the apparatus 210 by receiver 240.

An extra optical signal can be added (by adding an electrical signal for example) via input port 27b to transmitter 242. The extra optical signal then appears on input port 230b of circulator 230 and is then output to bidirectional input/output port 207. The optical signal that is to be introduced (added) may come from outside the optical apparatus 210 if transmitter 242 is "remote" (i.e not part of optical apparatus 210). Otherwise an electrical signal is placed at 27b, made optical by transmitter 242 and this optical signal is multiplexed into the total (multiplexed) signal by demultiplexer/multiplexer 214.

This extra signal from further bidirectional input/output port 207 will then be combined with the other component signals from bidirectional input/output ports 201–206 via multiplexer/demultiplexer 214 to provide a combined signal at bidirectional input/output port 212c. This is the multiplexing step. The combined signal is then sent by main circulator 212 to output port 212a.

FIGS. 7A, 7B, and 7C show a particular embodiment an alternate device 221 which is connected to the further bidirectional input/output port 201. The alternate device 221 provides either the add/drop function as previously described or a reflection operation as previously described. The alternate device 221 is comprised of optical circulator 270, 2-by-2 optical switch 280, receiver 290, and transmitter 292. The 2-by-2 switch 280 also includes input ports 280a and 280d and output ports 280b and 280c. The circulator 270 includes optical output port 270a and optical input port 270b and bidirectional optical input/output port 201. The receiver 290 has as its optical input port, port 280b and as its electrical output port, output port 221a. The transmitter 292 has as its electrical input port, input port 221b, and as its optical output port, port 280d. The output port 221a is for the possibly dropped signal and the input port 221b is for the possibly added signal. FIG. 7A also shows a dashed line 281 representing the optical interface location and a dashed line 291 representing the electrical interface location.

In operation, the alternate device 221 functions as follows. FIGS. 7A in conjunction with FIG. 7C shows the alternate device 221 in a first state a/k/a an add/drop state. In this state light entering bidirectional port 201 is passed to the receiver 290 for detection and light from the transmitter is sent out through the bidirectional port 201. In this add/drop state the switch 280 is in a "bar" state. A component optical signal coming in on bidirectional input/output port 201 enters circulator 270 and is sent to output port 270a. The component signal proceeds from output port 270a to input port 280a of the 2-by-2 switch 280. The 2-by-2 switch 280 is in a pass through or transmission mode in FIG. 7C, the "bar" state. The component signal proceeds through optical guide 282 to output port 280b then to receiver 290. (The optical guide 282 is conceptual, there may not be a physical guide 282). The detected component signal is then sent out electrical output port 221a and thus dropped from the overall signal.

A extra component electrical signal coming in electrical input port 221b is sent to transmitter 292 and the optical output to input port 280d of the 2-by-2 optical switch 280. The signal then proceeds through optical guide 284 (which may only be "conceptual" rather than physical), shown in FIG. 7C, and to optical output port 280c of the 2-by-2 switch 280. The optical signal then proceeds to input port 270b of the circulator 270 and then to further bidirectional input/output port 201. The extra component optical signal is combined, i.e. multiplexed, with the other optical component signals from bidirectional input/output ports 202–207 by optical multiplexer/demultiplexer 214.

The reflection state of the switch 280 is shown with reference to FIG. 7A in conjunction with FIG. 7B, the "cross state". This can also be called the "loop back" state. In this state a signal entering the bidirectional port 201 leaks again through 201. Light leaving the transmitter 292 is sent to receiver 290 for detection. This time a component signal coming in input port 280a of the 2-by-2 optical switch 280 is sent via optical guide 285 (possibly only "conceptual") to output port 280c. The component signal is thus reflected back through circulator 270 to the bidirectional input/output port 201 and combined, or multiplexed, back in with the overall signal by multiplexer/demultiplexer 214.

Optionally, as shown in FIG. 7B, the ports 280b and 280d are connected with a optical guide (with optional attenuation) 283 (possibly only "conceptual"). This allows the transmitter 292 to optically communicate with the receiver 290 (with optional attenuation) which may be useful to perform "loop back" test an electrical signal from input port 221b as reproduced on electrical output port 221a.

In the above circuits an input port of one device may serve as an output port of another device and vice versa.

Figure 9:
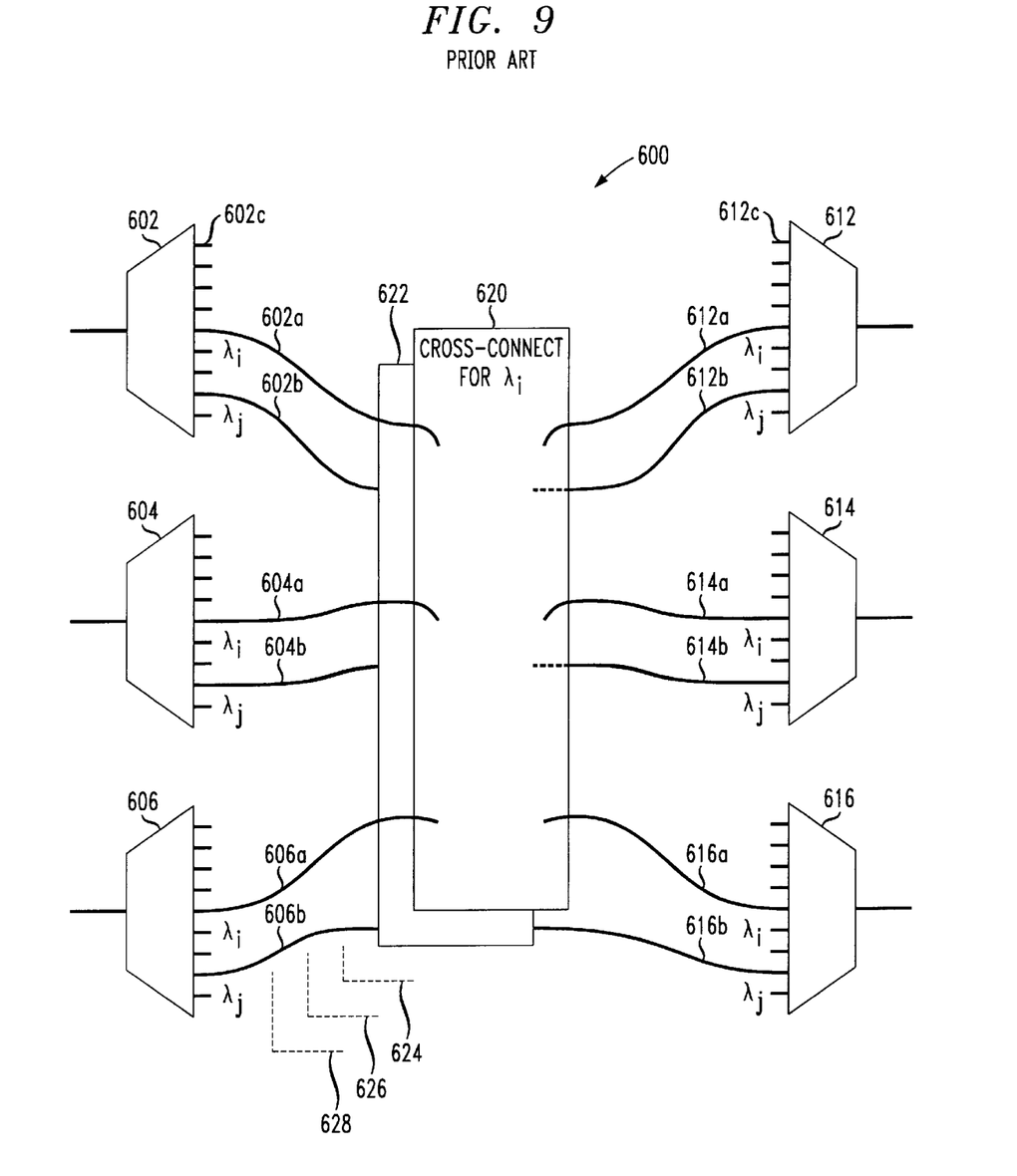
FIG. 9 shows a prior art optical device where different optical cross connections are provided based on wavelength of optical signals.

FIG. 9 shows a prior art optical device 600 for providing optical cross connection for various individual wavelengths of optical signals. The optical device 600 includes demultiplexers 602, 604, and 606, multiplexers 612, 614, and 616 and optical cross connection sections 620 and 622. Cross connection sections 620 and 622 provide optical cross connection for optical signals having a wavelengths of $\lambda_i$ and $\lambda_j$, respectively. For example, optical signals having a wavelength $\lambda_i$ on output ports 602a, 604a, and 606a of demultiplexers 602, 604, and 606 can be connected through optical cross connection section 620, to, for example, input ports 614a, 612a, and 616a, respectively. In this manner the optical signals can be arbitrarily reordered. Likewise optical signals having a wavelength of $\lambda_j$ on output ports 602b, 604b, and 606b of demultiplexers 602, 604, and 606 can be connected through optical cross connection section 622, to, for example, input ports 616b, 614b, and 612b, respectively. In this manner the optical signals, at $\lambda_j$ can be arbitrarily reordered. The reorderings for $\lambda_i$ need not be the same as that for $\lambda_j$. Dotted lines 624, 626, and 628 are used to show that there are a plurality of further cross connection sections similar to sections 620 and 622 intended to reorder other wavelengths. An output port, such as output port 602c is connected to its appropriate cross connection section and an input port such as input port 612c is connected to its appropriate cross connection section depending on wavelength. Most generally, there can be anywhere from 0 (zero) to k cross connects where k is the maximum number of further input/output ports on a demultiplexer/multiplexer.

Figure 10:
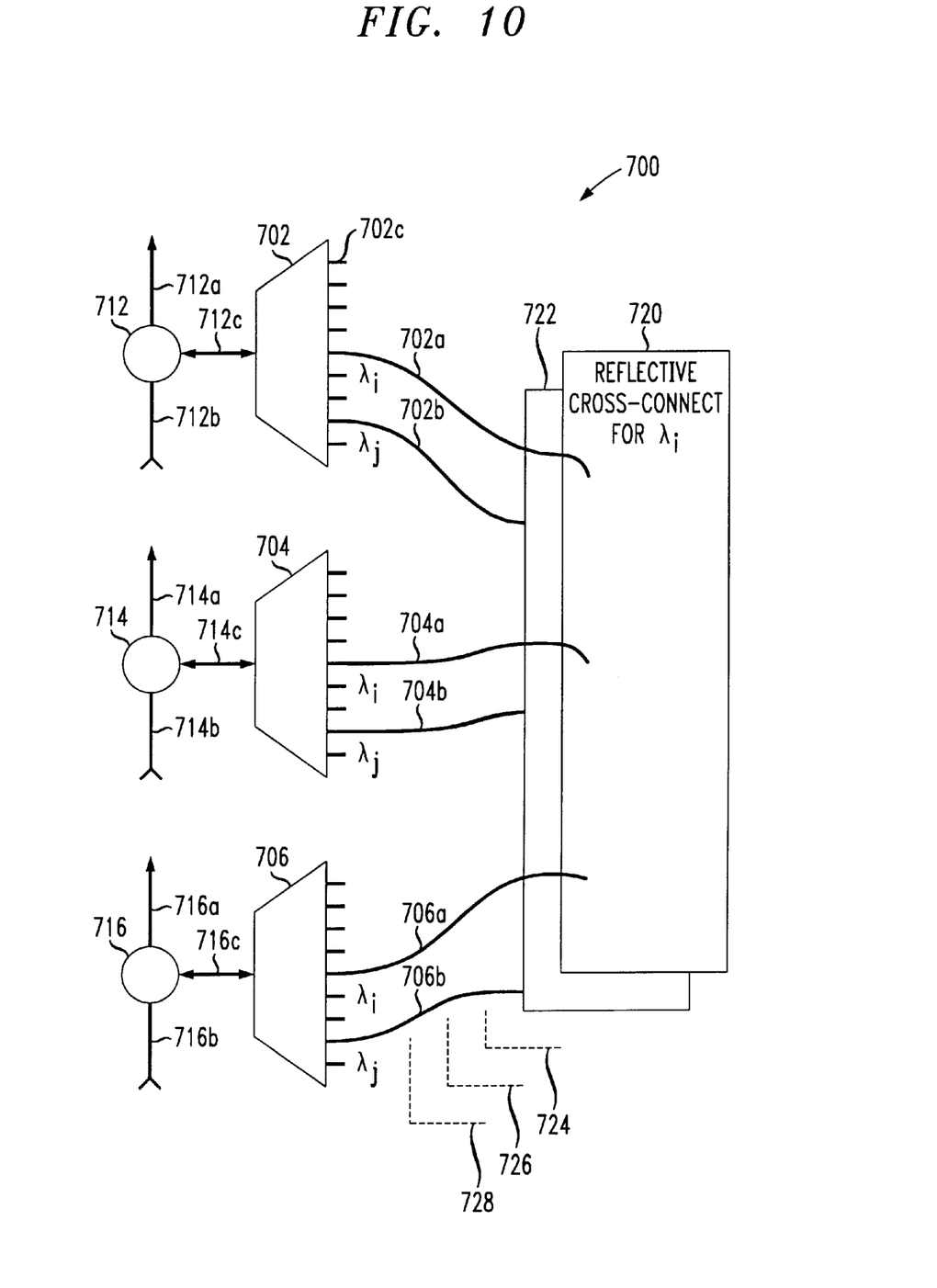
FIG. 10 shows an optical apparatus in accordance with the present invention where optical cross connection is provided based on wavelength of optical signals.

FIG. 10 shows an exemplary optical apparatus 700 in accordance with the present invention. The optical apparatus 700 includes main optical circulators 712, 714, and 716, which have bidirectional ports 712c, 714c, and 716c which are part of and which are connected to optical demultiplexer/multiplexers 702, 704, and 706. The circulators 712, 714 and 716 also have ports 712a–b, 714a–b, and 716a–b, respectively, analagous to other embodiments previously described for example in FIG. 1. The operation of main circulators 712, 714, and 716 can be similar to main circulator 12 of FIG. 1. The optical apparatus 700 also includes reflective cross connection sections 720 and 722. Reflective cross connection sections 720 and 722 are used for optical signals having a wavelength of $\lambda_i$ and $\lambda_j$, respectively. A further bidirectional port 702a of demultiplexer/multiplexer 702 is connected through reflective cross connection section 720 to either bidirectional port 702a, 704a or 706a or some other bidirectional port suitable for $\lambda_i$ of some demultiplexer/multiplexer not shown. The further bidirectional port 702a has an optical signal on it having a wavelength of $\lambda_i$. (There can be any further number of demultiplexer/multiplexers). The optical signals, which also have a wavelength of $\lambda_i$, on further bidirectional ports 704a and 706a also are cross connected to the same or other bidirectional ports by cross connection section 720.

Similarly, a further bidirectional port 702b has an optical signal on it having a wavelength of $\lambda_j$ and this optical signal is sent by cross connect section 722 to further bidirectional ports 702b, 704b, or 706b or some other bidirectional port, suitable for $\lambda_j$. The optical signals, which also have a wavelength of $\lambda_j$, on further bidirectional ports 704b and 706b, also are cross connected to the same or other bidirectional ports by cross connection section 722.

In FIG. 10, the cross connection is done by optical means (hence wavelength of signals cannot be altered); whereas in FIG. 1 the interchange is done electronically and since the wavelength of each transmitter does not need to watch the wavelengths received by each receiver, wavelength changes can be accomplished.

Other output ports such as output port 702c of multiplexer/demultiplexer 702 may be connected to other cross connection sections, and have optical signals of other wavelengths. 702c may be connected to other transition means as illustrated in FIG. 1, FIG. 3, FIG. 5, and FIG. 13.

The dashed lines 724, 726, and 728 are to shown that there may be a plurality of further cross connection sections for a plurality of further wavelengths. In this embodiment of FIG. 10, only particular wavelength specific groups are interchanged, no wavelength conversion. Generally, there can be anywhere from 0 (zero) to k reflective cross connects where k is the maximum number of further input/output ports on a demultiplexer/multiplexer. Other wavelengths may be handled by other transition means.

Figure 11:
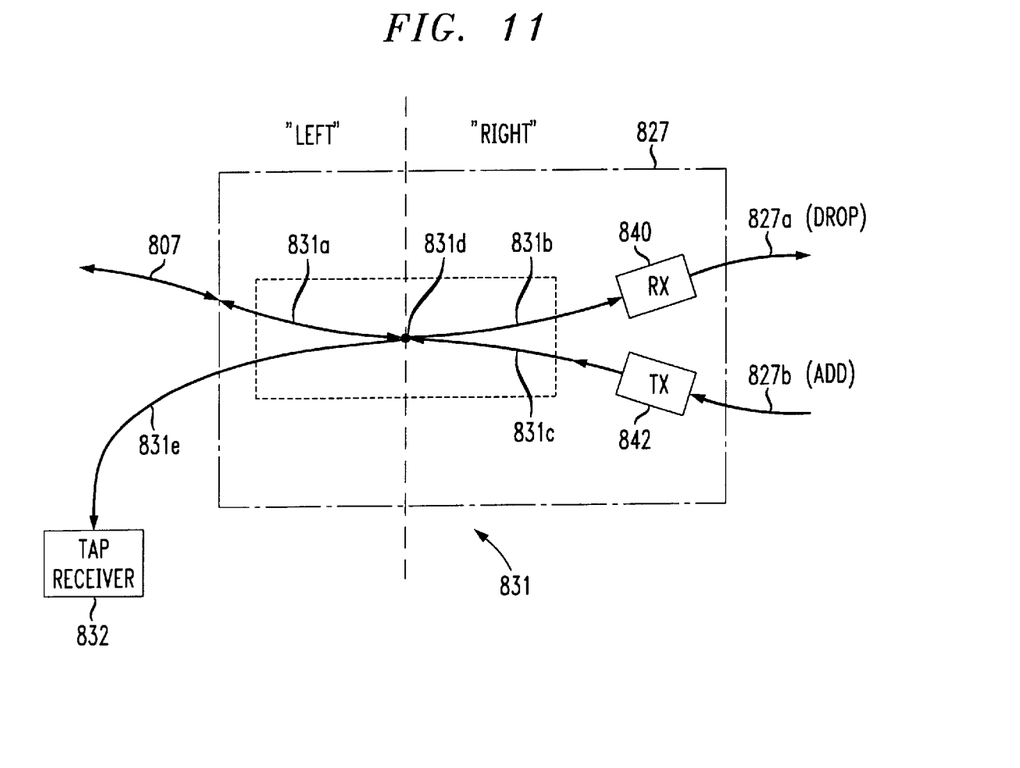
FIG. 11 shows an alternative transceiver device.

FIG. 11 shows a transceiver 827 which can be used instead of the transceiver 227 shown in FIG. 6. The transceiver 827 includes a bidirectional input/output port 807 which is the same as the bidirectional input/output port 207 shown in FIG. 6. The transceiver 827 further includes a 2×2 ("2 by 2") bidirectional coupler 831, a tap receiver 832, a receiver 840, and a transmitter 842. The bidirectional coupler 831 includes a bidirectional port 831a, an output port 831b, an input port 831c, a node 831d, and a tap line 831e. The output port 831b is an optical input to the receiver 840. The receiver 840 has an electrical output 827a for dropping signals. The transmitter 842 has an electrical input 827b and an optical output 831c. The optical output 831c is sent to the node 831d.

The transceiver 827, unlike the transceiver 227, does not include a circulator, but rather the 2×2 50% optical coupler 831. The optical coupler 831 is less expensive than an isolator but it loses optical power (i.e. wastes it). One half of the light entering on the bidirectional port 831a is not directed to output port 831b and at the receiver 840 and instead is wasted by being directed towards input port 831c towards the transmitter 842. Also one half of the light from the transmitter 842 is not directed back to the bidirectional port 807 but rather is largely wasted going towards the optional monitor or tap 832 which may need considerably less power to perform its function adequately. Generally speaking any light coming in either ports 831a or 831e on the "left" is split into ports 831b and 831c on the "right". Similarly any light coming in either port 831b or 831c is split into ports 831a and 831e.

Figure 12:
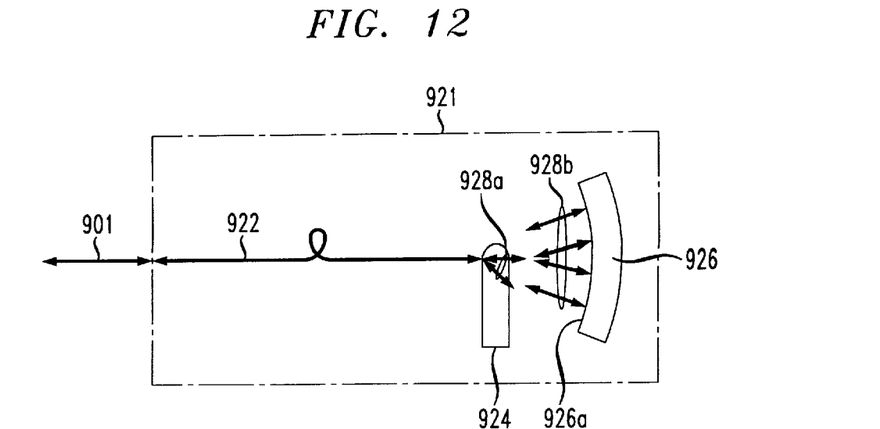
FIG. 12 shows an alternative reflective variable attenuator device.

FIG. 12 shows an alternative to the reflective variable attenuator 121 shown in FIG. 4. Reflective variable attenuator 921, which does not include a circulator, is connected to the bidirectional input/output port 901 which is the same as bidirectional input/output port 101. The reflective variable attenuator 921 includes an optical fiber or an optical waveguide 922, an obscuration 924, and a refocussing reflective mirror 926. The obscuration 924 can be placed in the path of light rays such as light ray 928b exitting the optical fiber or guide 922 towards the mirror 926 and in the path of light ray 928a entering the optical fiber 922 after being reflected off mirror 926. The obscuration 924 can also be taken completely out of the path of the light rays 928a or 928b. The obscuration 924 may be placed in the path of some but not all of the light rays exiting and entering the fiber 922.

When the obscuration 924 is completely out of the way of the light rays, light exiting the right end of the fiber or guide 922 diverges and travels through space towards the mirror 926, hits the curved surface 926a of the mirror 926, and is reflected and refocused back into the right end of the fiber 922. This is the mirror or high reflective coupling case. Moving the obscuration 924 progressively in the way will cause less of the light to be returned, and thus will cause increasing attenuation of the returning light beam.

Figure 13:
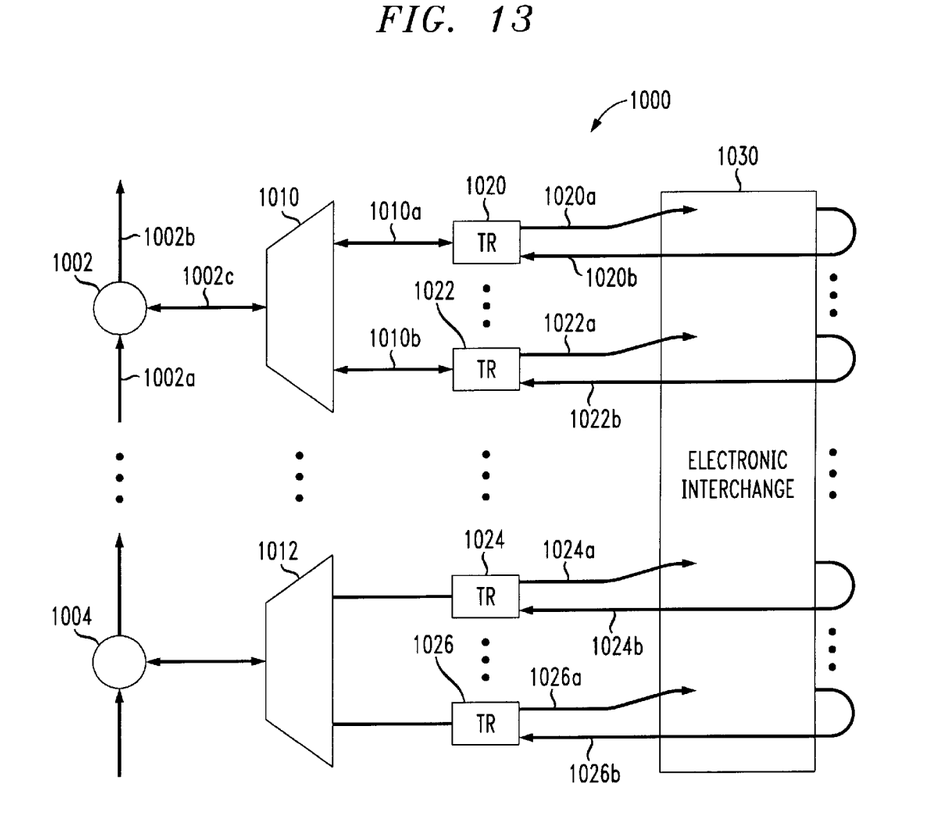
FIG. 13 shows another optical apparatus in accordance with the present invention.

FIG. 13 shows an exemplary optical apparatus 1000 in accordance with another embodiment of the present invention. The optical apparatus 1000 includes circulators 1002, 1004, and a plurality of further circulators not shown. The optical apparatus 1000 further includes multiplexer/demultiplexer 1010 and 1012 and possibly more multiplexer/demultiplexers not shown, transceivers 1020, 1022, 1024, and 1026 and possibly more transceivers not shown. The optical apparatus also includes electronic interchange section 1030.

Each circulator has three or more ports. For example, circulator 1002 has a first port 1002a, a second bidirectional port 1002c, and a third port 1002b. The bidirectional port 1002c is connected to the demultiplexer/multiplexer 1010. The demultiplexer/multiplexer 1010 is connected to further bidirectional ports 1010a and 1010b and zero or more further bidirectional ports not shown. Each further bidirectional port is preferably connected to a transceiver. For example, transceiver 1020 is connected to the bidirectional port 1010a. Transceiver 1020 has an electrical output port 1020a which is connected to an input of the electronic interchange unit 1030. Transceiver 1020 has an electronic input port 1020b which is connected to an output port of the electronic interchange unit 1030. Transceivers 1022, 1024, and 1026 have similar input and output ports 1022a and 1022b, 1024a and 1024b, and 1026a and 1026b which are connected to the electronic interchange unit 1030.

In general the electronic interchange unit 1030 changes space, i.e. takes an output from one of the multiplexers 1010, 1012 or others not shown and sends it the same or another of the multiplexers. For example an output from transceiver 1020, output 1020a could be sent to input 1024b of transceiver 1024, and thus be changed from multiplexer 1010 to multiplexer 1012. The electronic interchange 1030 also changes wavelength by changing the ports of a particular multiplexer. For example, an output for transceiver 1020, output 1020a could be sent to input 1022b of transceiver 1022, and thus be changed to from bidirectional port 1010a to bidirectional port 1010b of the demultiplexer/multiplexer 1010. Both space and wavelength, in this example, would be changed by electronic conversion (as in FIG. 1 embodiment).

Figure 14:
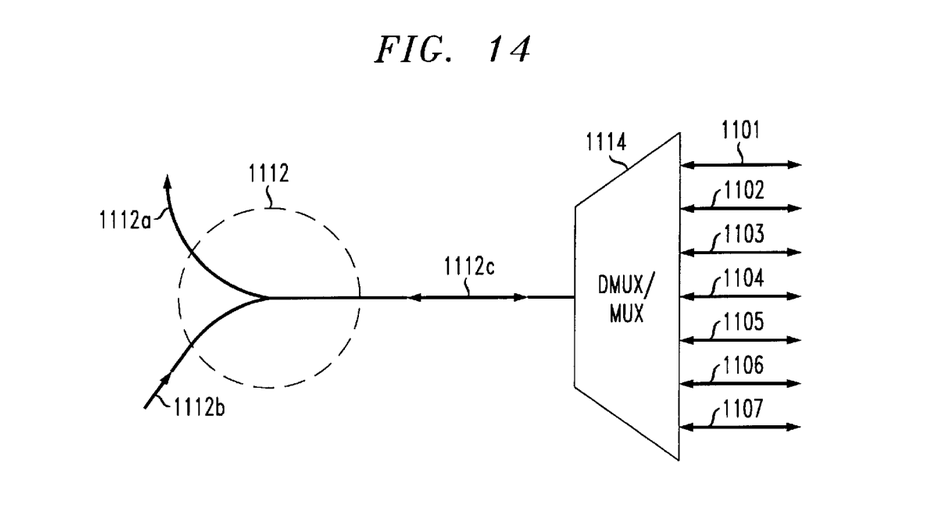
FIG. 14 shows components of an alternative optical apparatus in accordance with the present invention wherein a coupler is used instead of a circulator.

FIG. 14 shows components of an exemplary alternative optical apparatus in accordance with the present invention wherein a coupler is used instead of a circulator. FIG. 14 shows a coupler 1112 which is comprised of ports 1112a, 1112b, and 1112c. The coupler 1112 can be used in place of a main circulator, such as main circulator 12 in FIG. 1, main circulator 112 in FIG. 3, main circulators 212 in FIG. 5, or one or more of main circulators 714 or 716 in FIG. 10, or one or more of main circulators 1002 and 1004 in FIG. 13. The demultiplexer/multiplexer 1114 and its input/output ports 1101–1107 can be the same as the demultiplexer/multiplexers and input/output ports shown in the previously mentioned figures. The coupler 1112 could also be replaced by a two by two coupler. The performance of a coupler 1112 is not as good as a circulator but it is cheaper, more compact and can be made monolithic along with the demultiplexer/multiplexer.

While the foregoing invention has been described with respect to preferred embodiments, it is understood that various changes and modifications would be recognized by those skilled in the art and would not depart from the spirit of the present invention or the scope of the claims of the present invention.

I claim:

1. An optical apparatus comprised of:

a combination multiplexer/demultiplexer comprised of:

a first bidirectional main input/output port;

a set of further bidirectional input/output ports;

a main coupling device comprised of a first, second, and third port wherein:

the second port of the coupling device is connected to the first bidirectional main input/output port of the combination multiplexer/demultiplexer;

and further comprised of a transition device for taking a first output from a first further bidirectional input/output port of the combination multiplexer/demultiplexer and supplying the first output to a second further bidirectional input/output port of the combination multiplexer/demultiplexer, said transition device connected to both the first and second further bidirectional input/output ports of the combination multiplexer/demultiplexer.

2. The optical apparatus of claim 1 wherein:

the main coupling device is comprised of a main circulator.

3. The optical apparatus of claim 1 wherein:

the main coupling device is comprised of a main coupler.

4. The optical apparatus of claim 1 wherein the first and second further bidirectional input/output ports are one and the same.

5. The optical apparatus of claim 4 wherein:

the main coupling device is comprised of a main circulator.

6. The optical apparatus of claim 4 wherein:

the main coupling device is comprised of a main coupler.

7. The optical apparatus of claim 1 wherein the first and second further bidirectional input/output ports are not one and the same.

8. The optical apparatus of claim 7 wherein:

the main coupling device is comprised of a main circulator.

9. The optical apparatus of claim 7 wherein:

the main coupling device is comprised of a main coupler.

10. The optical apparatus of claim 1 wherein the transition device is comprised of:

a first transmitter and receiver device.

11. The optical apparatus of claim 10 wherein:

the main coupling device is comprised of a main circulator.

12. The optical apparatus of claim 10 wherein:

the main coupling device is comprised of a main coupler.

13. The optical apparatus of claim 1 wherein:

the transition device is comprised of:

a first receiver having an optical input port and an electrical output port;

a first transmitter having an electrical input port and an optical output port;

a first further coupling device comprised of a first port, a second port, and a third port, the second port of the first further coupling device connected to the first further bidirectional input/output port of the multiplexer/demultiplexer, and the third port of the first further coupling device connected to the input port of the first receiver; and a second further coupling device comprised of a first port, a second port, and a third port, the second port of the second further coupling device connected to the second further bidirectional input/output port of the multiplexer/demultiplexer, and the first port of the second further coupling device connected to the output port of the first transmitter.

14. The optical apparatus of claim 13 wherein the first and second further coupling devices are one and the same.

15. The optical apparatus of claim 14 wherein:

the main coupling device is comprised of a main circulator;

the first further coupling device is comprised of a first further circulator;

and the second further coupling device is comprised of a second further circulator.

16. The optical apparatus of claim 14 wherein:

the main coupling device is comprised of a main coupler;

the first further coupling device is comprised of a first further coupler;

and the second further coupling device is comprised of a second further coupler.

17. The optical apparatus of claim 13 wherein the first and second further coupling devices are different and further comprising:

a second transmitter having an electrical input port and an optical output port;

a second receiver having an optical input port and an electrical output port;

wherein the first port of the first further coupling device is connected to the output port of the second transmitter;

wherein the third port of the second further coupling device is connected to the input port of the second receiver;

and wherein the first and second receivers are not one and the same and the first and second transmitters are not one and the same.

18. The apparatus of claim 17 and wherein:

the output port of the first receiver is connected to the input port of the first transmitter.

19. The optical apparatus of claim 18 wherein:

the main coupling device is comprised of a main circulator;

the first further coupling device is comprised of a first further circulator;

and the second further coupling device is comprised of a second further circulator.

20. The optical apparatus of claim 18 wherein:

the main coupling device is comprised of a main coupler;

the first further coupling device is comprised of a first further coupler;

and the second further coupling device is comprised of a second further coupler.

21. The optical apparatus of claim 17 wherein:

the coupling device is comprised of a main circulator;

the first further coupling device is comprised of a first further circulator;

and the second further coupling device is comprised of a second further circulator.

22. The optical apparatus of claim 17 wherein:

the main coupling device is comprised of a main coupler;

the first further coupling device is comprised of a first further coupler;

and the second further coupling device is comprised of a second further coupler.

23. The optical apparatus of claim 13 wherein:

the main coupling device is comprised of a main circulator;

the first further coupling device is comprised of a first further circulator;

and the second further coupling device is comprised of a second further circulator.

24. The optical apparatus of claim 13 wherein:

the main coupling device is comprised of a main coupler;

the first further coupling device is comprised of a first further coupler;

and the second further coupling device is comprised of a second further coupler.

25. The optical apparatus of claim 1 wherein the transition device is comprised of:

a reflective variable attenuator device which reflects and variably attenuates the first output.

26. The optical apparatus of claim 25 wherein:

the reflective variable attenuator device comprised of:
 a first further coupling device having first, second, and third ports, the second port of the first further coupling device connected to the first further bidirectional input/output port;
 a variable attenuator having an input port connected to the third port of the first further coupling device, and an output port connected to the first port of the first further coupling device;
 and wherein the first and second further bidirectional input/output ports are one and the same.

27. The apparatus of claim 26 and further comprised of:

a monitoring tap connected to an output port of the variable attenuator.

28. The optical apparatus of claim 27 wherein:

the main coupling device is comprised of a main circulator;

and the first further coupling device is comprised of a first further circulator.

29. The optical apparatus of claim 27 wherein:

the main coupling device is comprised of a main coupler;

and the first further coupling device is comprised of a first further coupler.

30. The optical apparatus of claim 26 wherein:

the main coupling device is comprised of a main circulator;

and the first further coupling device is comprised of a first further circulator.

31. The optical apparatus of claim 26 wherein:

the main coupling device is comprised of a main coupler;

and the first further coupling device is comprised of a first further coupler.

32. The optical apparatus of claim 25 wherein:

the main coupling device is comprised of a main circulator.

33. The optical apparatus of claim 25 wherein:

the main coupling device is comprised of a main circulator.

34. The optical apparatus of claim 1 further comprised of:

a transmitter and receiver device;

wherein the combination multiplexer/demultiplexer is further comprised of a third further bidirectional input/output port which is connected to the transmitter and receiver device;

wherein the transition device is comprised of:
 a mirror;
 wherein the first and second further bidirectional input/output ports of the combination multiplexer/demultiplexer are one and the same, and are connected to the mirror; and
 wherein the third further bidirectional input/output port of the combination multiplexer/demultiplexer is distinct from the first and second further bidirectional input/output ports of the combination multiplexer/demultiplexer.

35. The apparatus of claim 34 wherein the transmitter and receiver device is comprised of:

a first further coupling device having first, second, and third ports, the second port being connected to the third further bidirectional input/output port of the combination multiplexer/demultiplexer;

a receiver having an input port connected to the third port of the first further coupling device and an output port; and a transmitter having an input port and an output port connected to the first port of the first further coupling device.

36. The optical apparatus of claim 35 and further wherein:

the combination multiplexer/demultiplexer is comprised of a fourth further bidirectional input/output port;

and the optical apparatus is further comprised of a device for allowing either reflection or dropping an optical signal and adding another optical signal, said device connected to the fourth further bidirectional input/output port.

37. The optical apparatus of claim 36 and further wherein:

the device for allowing either reflection or dropping an optical signal and adding another optical signal is comprised of:
 a second further coupling device having first, second, and third ports, the second port being connected to the fourth further bidirectional input/output port of the multiplexer/demultiplexer;
 a 2-by-2 switch having first and second input ports, the first input port of the 2-by-2 switch connected to the third port of the second further coupling device, the 2-by-2 switch having first and second output ports, the second output port of the 2-by-2 switch connected to the first port of the second further coupling device;
 a second receiver having an input port connected to the first output port of the 2-by-2 switch, and an output port; port;
 a second transmitter having an input port and an output port connected to the second input port of the 2-by-2 switch;
 wherein the 2-by-2 switch can be placed in at least a first state and a second state,
 the first state wherein the first and second input ports of the 2-by-2 switch are connected to the first and second output ports, respectively of the 2-by-2 switch, so that an optical signal can pass from the third port of the second further coupling device to the input port of the second receiver and an optical signal can pass from the output port of the second transmitter to the first port of the second further coupling device;
 the second state wherein the first input port of the 2-by-2 switch is connected to the second output port of the 2-by-2 switch;
 the first input port of the 2-by-2 switch is not connected to the first output port of the 2-by-2 switch, the second input port of the 2-by-2 switch is not connected to the second output port of the 2-by-2 switch, so that an optical signal from the third port of the second further coupling device is reflected back and does not pass to the second receiver, and an optical signal from the second transmitter does not pass to the first port of the second further coupling device.

38. The optical apparatus of claim 36 wherein:

the main coupling device is comprised of a main circulator;

and the first further coupling device is comprised of a first further circulator.

39. The optical apparatus of claim 36 wherein:

the main coupling device is comprised of a main coupler;

and the first further coupling device is comprised of a first further coupler.

40. The optical apparatus of claim 35 wherein:

the main coupling device is comprised of a main circulator;

and the first further coupling device is comprised of a first further circulator.

41. The optical apparatus of claim 35 wherein:

the main coupling device is comprised of a main coupler;

and the first further coupling device is comprised of a first further coupler.

42. The optical apparatus of claim 34 wherein:

the main coupling device is comprised of a main circulator.

43. The optical apparatus of claim 34 wherein:

the main coupling device is comprised of a main coupler.

* * * * *